United States Patent
Hsiao (10) Patent No.: US 12,546,876 B2
(45) Date of Patent: Feb. 10, 2026

(54) OBJECT SENSING METHOD AND RADAR APPARATUS

(71) Applicant: RichWave Technology Corp., Taipei (TW)

(72) Inventor: Chun-Hsien Hsiao, Taipei (TW)

(73) Assignee: RichWave Technology Corp., Taipei (TW)

( * ) Notice: Subject to any disclaimer, the term of this patent is extended or adjusted under 35 U.S.C. 154(b) by 530 days.

(21) Appl. No.: 18/090,521

(22) Filed: Dec. 29, 2022

(65) Prior Publication Data

US 2024/0201357 A1  Jun. 20, 2024

(30) Foreign Application Priority Data

Dec. 15, 2022  (TW) .................... 111148312

(51) Int. Cl.
 *G01S 13/42* (2006.01)
 *G01S 7/35* (2006.01)
 *G01S 7/41* (2006.01)

(52) U.S. Cl.
 CPC .............. *G01S 13/42* (2013.01); *G01S 7/356* (2021.05); *G01S 7/41* (2013.01)

(58) Field of Classification Search
 CPC .............. G01S 13/42; G01S 7/356; G01S 7/41
 USPC .......................................................... 342/22
 See application file for complete search history.

(56) References Cited

U.S. PATENT DOCUMENTS

| 10,222,463 B2 * | 3/2019 | Hong | G01S 13/72 |
| 10,962,640 B2 * | 3/2021 | Kaino | G01S 13/343 |
| 11,125,869 B2 * | 9/2021 | Santra | G01S 13/72 |
| 11,199,619 B2 * | 12/2021 | Kishigami | G01S 13/42 |
| 11,210,517 B2 * | 12/2021 | Alalusi | G06V 20/20 |

(Continued)

FOREIGN PATENT DOCUMENTS

| EP | 3517994 A1 * | 7/2019 | G01S 13/08 |
| EP | 3978949 A2 * | 4/2022 | G01S 13/003 |

(Continued)

OTHER PUBLICATIONS

Hermann Rohling et al., "Radar CFAR Thresholding in Clutter and Multiple Target Situations", IEEE Transactions on Aerospace and Electronic Systems, Jul. 1983, pp. 608-621.

(Continued)

*Primary Examiner* — Nuzhat Pervin
(74) *Attorney, Agent, or Firm* — JCIPRNET (57) ABSTRACT

An object sensing method and a radar apparatus are provided. In the method, initial sensing data is obtained through a single antenna. The initial sensing data is generated according to an echo received by the single antenna. The initial sensing data includes sensing intensities of multiple time points. The initial sensing data is converted into pre-processing sensing data. The pre-processing sensing data includes a corresponding relationship between multiple distances and the sensing intensities at those time points. One or more feature parameters of the pre-processing sensing data are obtained. The feature parameters respond to the existence of one or more objects. Inertia of the feature parameter between those time points is determined. The inertia is a period when the object exists at those time points. The number of objects is determined according to inertia. Accordingly, the accuracy of number estimation is improved.

17 Claims, 11 Drawing Sheets

(56) References Cited

U.S. PATENT DOCUMENTS

| | | | | |
|---|---|---|---|---|
| 2007/0291249 A1* | 12/2007 | Nakamura | ............... | G01S 7/486 |
| | | | | 356/4.01 |
| 2008/0088497 A1* | 4/2008 | Nakanishi | ............... | G01S 13/42 |
| | | | | 342/158 |
| 2011/0037640 A1* | 2/2011 | Schmidlin | ................ | G01S 7/03 |
| | | | | 342/55 |
| 2011/0095935 A1* | 4/2011 | Shim | .................... | H05K 9/0071 |
| | | | | 342/14 |
| 2013/0113647 A1* | 5/2013 | Sentelle | ................. | G01S 13/04 |
| | | | | 342/22 |
| 2013/0120184 A1* | 5/2013 | Aizawa | ................ | G01S 13/931 |
| | | | | 342/146 |
| 2016/0041260 A1* | 2/2016 | Cao | ......................... | G01S 7/285 |
| | | | | 342/129 |
| 2016/0124084 A1* | 5/2016 | Lim | ...................... | G01S 13/931 |
| | | | | 342/160 |
| 2018/0329030 A1* | 11/2018 | Laifenfeld | ............ | G01S 13/343 |
| 2019/0050552 A1* | 2/2019 | Kayhani | ................ | G07C 9/10 |
| 2019/0212429 A1* | 7/2019 | Yamanouchi | ...... | A61B 5/02416 |
| 2019/0391249 A1* | 12/2019 | Takeuchi | ............. | G01S 13/536 |
| 2020/0116855 A1* | 4/2020 | Jo | ......................... | G01S 13/726 |
| 2021/0034827 A1* | 2/2021 | Tuttle | ...................... | G01S 13/84 |
| 2022/0029642 A1* | 1/2022 | Helmboldt | ........... | H04B 1/0003 |
| 2022/0108547 A1* | 4/2022 | Alalusi | .................. | G06V 20/20 |
| 2023/0145623 A1* | 5/2023 | Alalusi | ................. | G01S 5/0284 |
| | | | | 701/500 |
| 2023/0314552 A1* | 10/2023 | Pyo | ........................... | G01S 7/41 |
| | | | | 455/456.1 |
| 2024/0219551 A1* | 7/2024 | Sasaki | ................... | G01S 13/345 |
| 2024/0310509 A1* | 9/2024 | Li | .......................... | G01S 13/765 |
| 2024/0313870 A1* | 9/2024 | Li | ........................... | H04B 7/22 |

FOREIGN PATENT DOCUMENTS

| | | | | |
|---|---|---|---|---|
| EP | 3721258 B1 * | 6/2024 | ............ | G01S 7/354 |
| EP | 3812791 B1 * | 9/2024 | ................ | G06N 3/09 |
| EP | 3663790 B1 * | 1/2025 | ........... | G01S 13/931 |
| KR | 20180085268 | 7/2018 | | |
| TW | 201802492 | 1/2018 | | |
| WO | WO-2019167350 A1 * | 9/2019 | ............... | G08G 1/16 |

OTHER PUBLICATIONS

"Office Action of Taiwan Counterpart Application", issued on Dec. 15, 2023, p. 1-p. 9.

* cited by examiner

OBJECT SENSING METHOD AND RADAR APPARATUS

CROSS-REFERENCE TO RELATED APPLICATION

This application claims the priority benefit of Taiwan application serial no. 111148312, filed on Dec. 15, 2022. The entirety of the above-mentioned patent application is hereby incorporated by reference herein and made a part of this specification.

BACKGROUND

Technical Field

The disclosure relates to a radar technology, and particularly relates to an object sensing method and a radar apparatus.

Description of Related Art

There are many object sensing technologies in wide application today. For example, infrared sensing, photo identification or radio frequency identification (RFID). However, these sensing technologies may all have some problems. For example, infrared sensing may be affected by shielding or temperature to cause misjudgement. For another example, photo identification may be affected by illuminance or human body posture to cause misjudgement, and there are even more concerns about privacy violations.

Linear frequency modulated continuous waves (FMCW) have been widely used in radar applications. For example, in autonomous vehicles and vehicle safety applications, a linear FMCW radar may provide accurate measurement results on distances and speeds of obstacles and vehicles. The FMCW radar may use a chirp signal, and a frequency of the chirp signal increases linearly along with time. Existence of an object may be further estimated according to a phase difference between two chirp signals in radar echo waves. However, in an application situation of multi-object detection, a single antenna radar may cause subsequent object tracking errors due to position overlapping of moving objects.

SUMMARY

An embodiment of the disclosure provides an object sensing method adapted to a single antenna radar. The object sensing method is described below. Initial sensing data is obtained through a single antenna. The initial sensing data is generated according to an echo received by the single antenna. The initial sensing data includes sensing intensities of multiple time points. The initial sensing data is converted into pre-processing sensing data. The pre-processing sensing data includes a corresponding relationship between multiple distances and the sensing intensities at the time points. One or multiple feature parameters of the pre-processing sensing data are obtained. The feature parameters respond to existence of one or multiple objects. An inertia of the one or multiple feature parameters between the time points is determined. The inertia is a period during which the object exists at the time points. A number of the objects is determined according to the inertia.

An embodiment of the disclosure provides a radar apparatus including a single antenna, a transmitting circuit, a receiving circuit and a processor. The transmitting circuit is coupled to the single antenna and configured to transmit a sensing signal. The receiving circuit is coupled to the single antenna and configured to receive an echo of the sensing signal. The processor is coupled to the receiving circuit. The processor is configured to convert initial sensing data corresponding to the echo into pre-processing sensing data, and calculate a number of one or more objects corresponding to the pre-processing sensing data. The initial sensing data includes sensing intensities of multiple time points, and the pre-processing sensing data includes a corresponding relationship between multiple distances and the sensing intensities at the time points.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
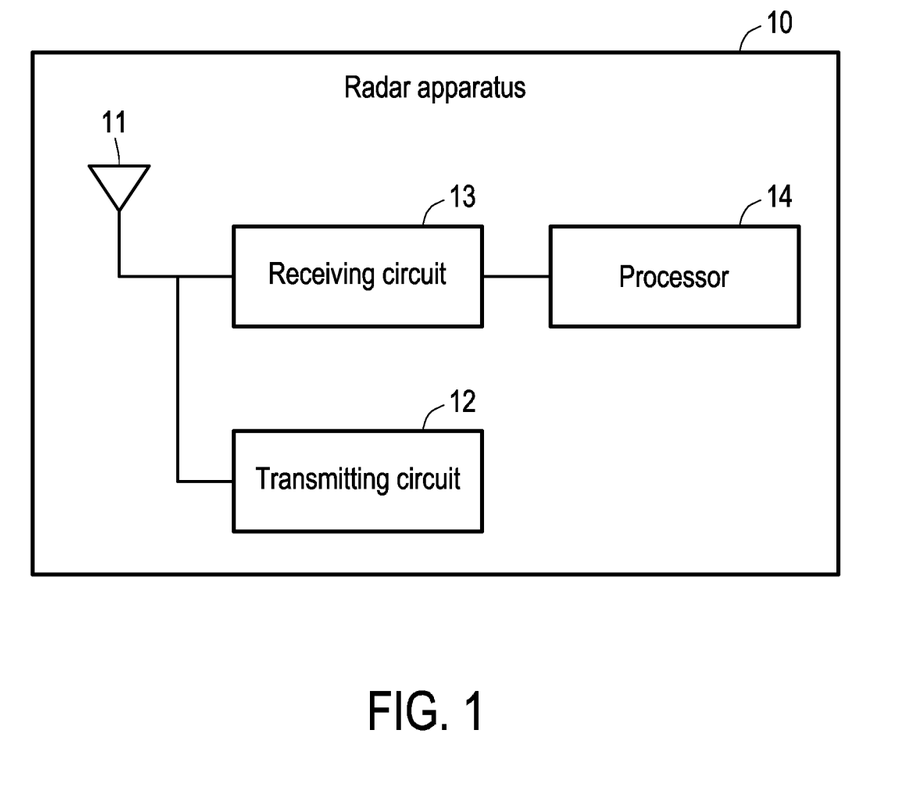
FIG. 1 is a component block diagram of a radar apparatus according to an embodiment of the disclosure.

FIG. 1 is a component block diagram of a radar apparatus 10 according to an embodiment of the disclosure. Referring to FIG. 1, the radar apparatus 10 includes an antenna 11, a transmitting circuit 12, a receiving circuit 13 and a processor 14. The radar apparatus 10 may be applied to fields such as meteorology, speed measurement, reversing, topography, military affairs, etc.

The radar apparatus 10 includes only a single antenna 11. The radar apparatus 10 may also be referred to as a single antenna radar, for example, the antenna 11 only includes one receiver (RX) and one transmitter (Tx).

The transmitting circuit 12 is coupled to the antenna 11. In an embodiment, the transmitting circuit 12 is configured to transmit a sensing signal through the antenna 11.

In an embodiment, the sensing signal transmitted by the transmitting circuit 12 may be a sawtooth wave, a triangle wave, or other signals adapted to FMCW (for example, linear, geometric or other chirp signals). For example, a frequency sweep signal for a FMCW radar, and the frequency thereof varies along with time during a frequency sweep period.

The receiving circuit 13 is coupled to the antenna 11. In an embodiment, the receiving circuit 13 is configured to receive an echo of the sensing signal through the antenna 11. The echo is generated when the sensing signal emitted by the transmission circuit 12 is reflected by an external object, but the disclosure is not limited thereto.

The processor 14 is coupled to the receiving circuit 13. The processor 14 may be a chip, a processor, a microcontroller, an application-specific integrated circuit (ASIC), or any type of digital circuit.

Hereinafter, the operation of the radar apparatus 10 is described below with reference of the various components in the radar apparatus 10.

Figure 2:
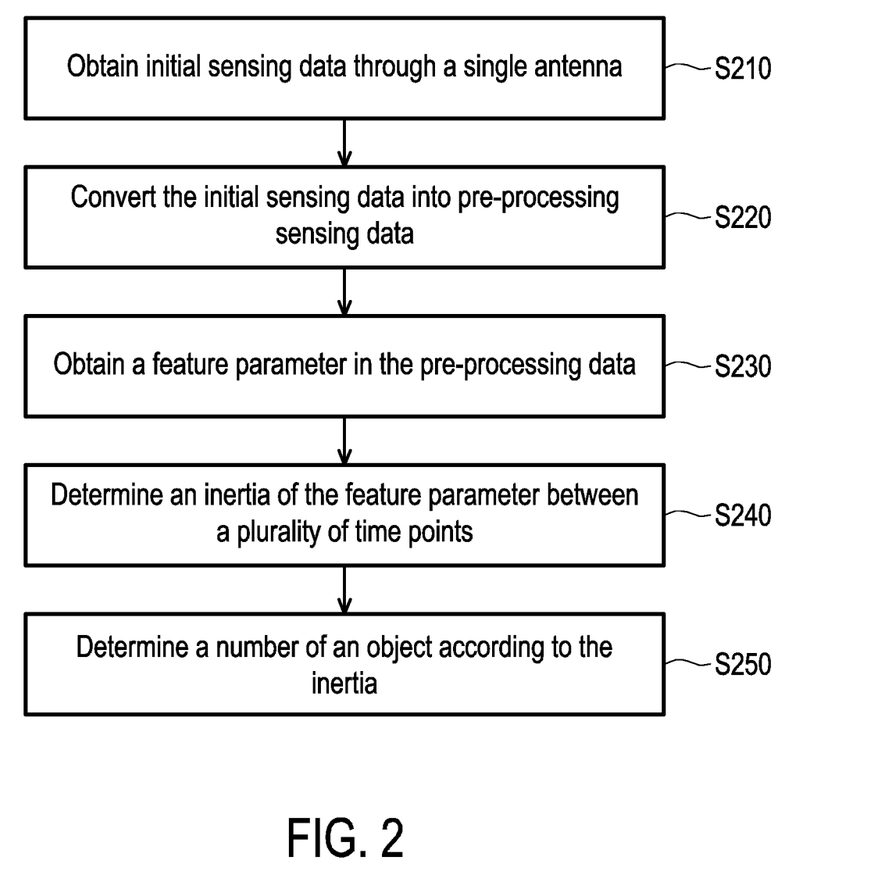
FIG. 2 is a flowchart of an object sensing method according to an embodiment of the disclosure.

FIG. 2 is a flowchart of an object sensing method according to an embodiment of the disclosure. Referring to FIG. 2, the processor 14 obtains initial sensing data through the receiving circuit 13 and the (single) antenna 11 (step S210). Specifically, the initial sensing data is generated according to the echoes received by the antenna 11. The initial sensing data includes sensing intensities of multiple time points. For example, at each time point, the processor 14 takes an intensity of the echo as the sensing intensity, and takes a collection of sensing intensities of multiple time points as the initial sensing data.

The processor 14 converts the initial sensing data into pre-processing sensing data (step S220). Specifically, the pre-processing sensing data includes a corresponding relationship between multiple distances and the sensing intensities at those time points.

Figure 3A:
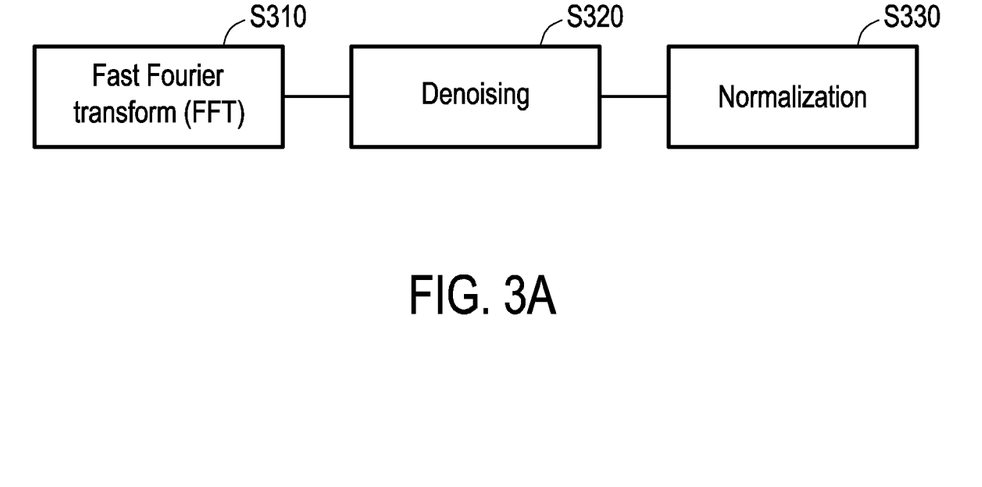
FIG. 3A is a flowchart of data conversion according to an embodiment of the disclosure.
Figure 3B:
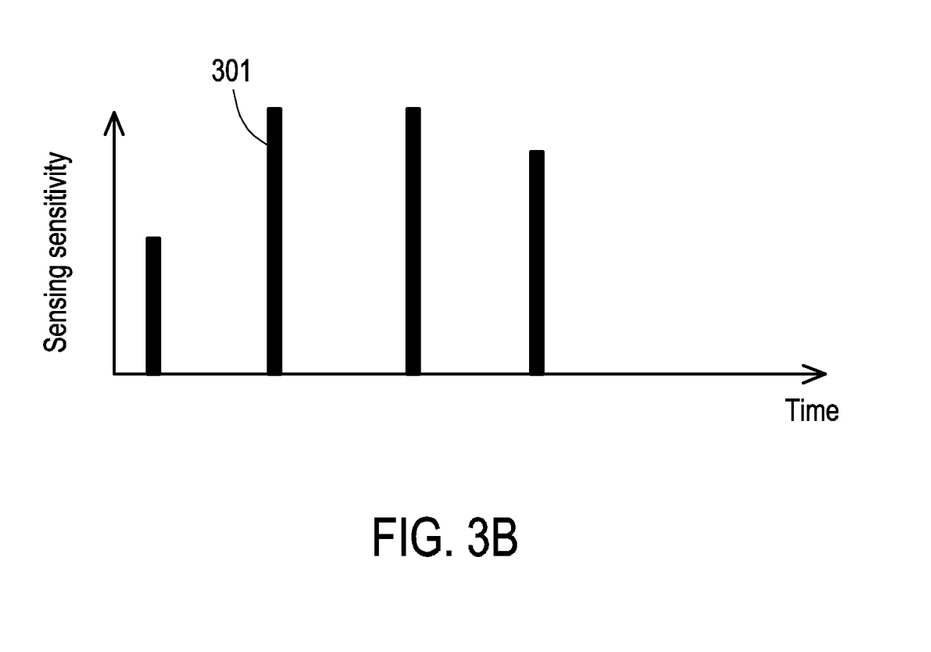
FIG. 3B is a schematic diagram of initial sensing data according to an embodiment of the disclosure.
Figure 3C:
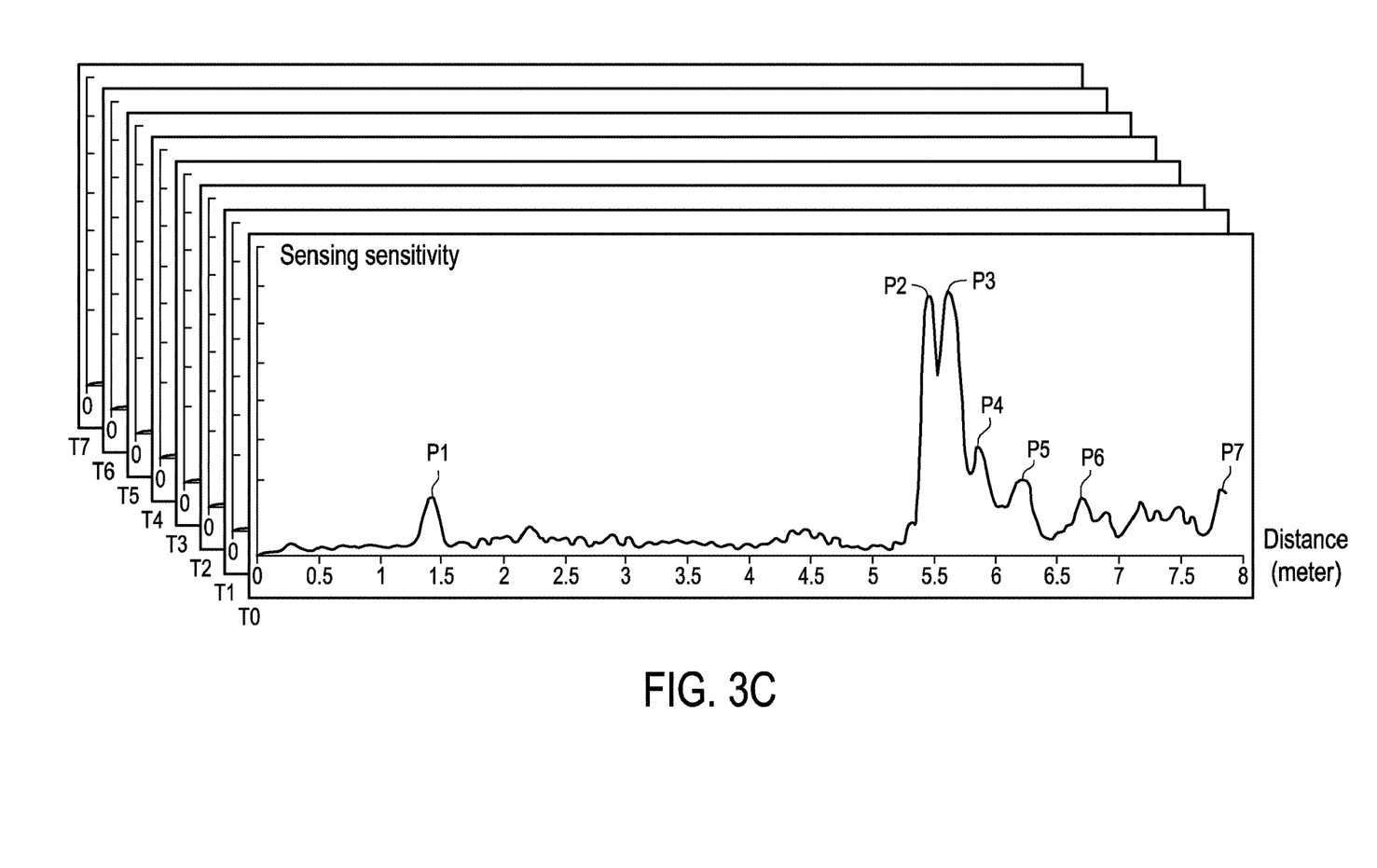
FIG. 3C is a schematic diagram of pre-processing sensing data according to an embodiment of the disclosure.

FIG. 3A is a flowchart of data conversion according to an embodiment of the disclosure. Referring to FIG. 3A, the processor 14 may perform fast Fourier transform (FFT) or other time-domain to frequency-domain conversions on the initial sensing data (step S310) to obtain one or more samples (which may form the pre-processing sensing data). Each sample corresponds to a distance and a sensing intensity thereof, and the sensing intensities of these samples are related to a sensing result of the object. For example, FIG. 3B is a schematic diagram of the initial sensing data according to an embodiment of the disclosure. Referring to FIG. 3B, if the receiving circuit 13 receives an echo 301, a signal intensity (i.e., the sensing intensity) of the echo 301 may be sensed on a time axis. FIG. 3C is a schematic diagram of the pre-processing sensing data according to an embodiment of the disclosure. Referring to FIG. 3C, after the time-domain to frequency-domain conversion, the sensing intensities corresponding to multiple time points at different distances may be obtained. The peaks with higher sensing intensity (for example, peaks P1-P7) may be used for object detection, which will be described in detail in the following embodiments.

In an embodiment, the processor 14 may also denoise the pre-processing sensing data converted from the initial sensing data (step S320). For example, objects that vary along with time but are at a constant distance may be considered as noise (for example, walls, buildings, or other obstacles), which may be removed or reduced accordingly.

In an embodiment, the processor 14 may also perform normalization on the pre-processing sensing data converted from the initial sensing data (step S330). For example, to adjust a δ (Delta) signal to alleviate the influence of distance on signal intensity.

Referring to FIG. 2, the processor 14 obtains one or multiple feature parameters in the pre-processing sensing data (step S230). Specifically, the feature parameters respond to existence of one or multiple objects. In an embodiment, the one or multiple feature parameters are peaks. For example, the peaks P1-P7 shown in FIG. 3C.

Figure 4:
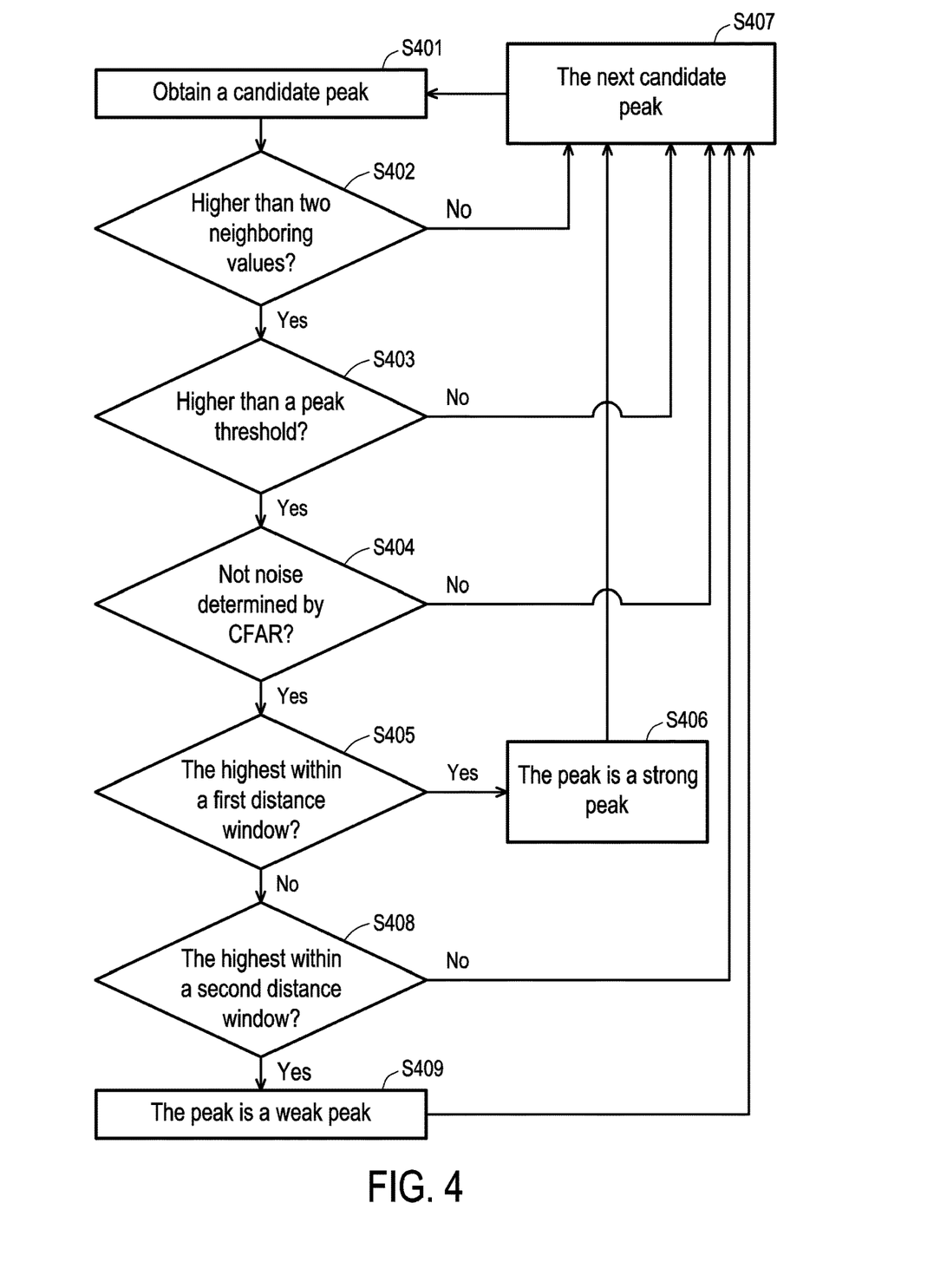
FIG. 4 is a flowchart of peak decision according to an embodiment of the disclosure.

There are one or more samples with higher sensing intensities in the pre-processing sensing data, which may be used as the peaks. There are many ways to determine the peaks. FIG. 4 is a flowchart of peak decision according to an embodiment of the disclosure. Referring to FIG. 4, the processor 14 may obtain a candidate peak (step S401). For example, for a frequency spectrum of each time point, the processor 14 searches for a δ (Delta) signal or peak in the pre-processing sensing data to serve as a candidate peak.

The processor 14 may determine whether the candidate peak is higher than two neighboring values (step S402). For example, the neighboring values are values that are at ±1, 5 or 10 centimeters adjacent to the candidate peak in the frequency spectrum.

The processor 14 may determine whether the candidate peak is higher than a peak threshold (step S403). Taking FIG. 3C as an example, the peaks P1-P7 are all higher than the peak threshold. It should be noted that the peak threshold is not limited to a single value. In an embodiment, according to radar or environment requirements, different distances may correspond to different thresholds. For example, a numerical correspondence between the distance and the threshold is linear or stepped. In an embodiment, the processor 14 may also (dynamically) adjust the peak threshold according to an actual demand.

The processor 14 may determine whether the candidate peak is not noise determined by a constant false alarm rate (CFAR) (step S404). The CFAR is a self-adjusting algorithm used in radar systems to sense objects and confront background noise, clutter and/or interference. The commonly used CFAR algorithm is, for example, cell averaging (CA)-CFAR, ordered statistics (OS)-CFAR, and trimmed average (TM)-CFAR. The CFAR algorithm may provide an intensity threshold to determine whether the sensing intensity (for example, power) of the radar echo response at the distance to be measured represents detection of an object.

Taking CA-CFAR as an example, a training cell and a guard cell are defined. The training cell may be located in the front and rear regions of a cell under test (CUT) (used to compare the sensing intensity and the intensity threshold) on the time axis, and is used to measure a noise intensity. The guard cell is adjacent to the cell under test and is used to prevent a target signal from leaking into the training cell. For the pre-processing sensing data at each time point, the cell under test in a window is detected by sliding the window. For each sliding step, the intensity threshold is determined according to the two training cells located in the front and rear regions of the cell under test, and an appropriate offset is given to scale the intensity threshold. The sensing intensity of the cell under test is compared with the intensity threshold. If the sensing intensity of the cell under test is larger than the intensity threshold, the signal in the cell under test is regarded as non-noise, otherwise the signal in the cell under test is regarded as noise.

It may be seen that conditions of the peak include higher than two neighboring values, higher than the peak threshold and not noise determined by the CFAR. If all conditions are met, the candidate peak is a peak. If any condition is not met, the candidate peak is not a peak, and a next candidate peak is evaluated accordingly (step S407). In some embodiments, an order of the peak decision may be different from step S402 to step S404 in FIG. 4 or some steps may be omitted.

In an embodiment, the peaks include strong peaks and weak peaks. The processor 14 may determine whether the peak is the highest within a first distance window (step S405). The first distance window is a specific distance range. For example, 0.5 meters. 1 meter or 2 meters. In response to a certain peak being the highest within the first distance window, the processor 14 may determine the peak as a strong peak (step S406), and evaluate a next candidate peak accordingly (step S407). Namely, the strong peak is the highest within the distance defined by the first distance window.

In response to the fact that the peak is not the highest within the first distance window, the processor 14 may determine whether the peak is the highest within a second distance window (step S408). The second distance window is another specific distance range. The second distance window is smaller than the first distance window. For example, 20 cm, 30 cm or 0.5 m. In response to a certain peak being the highest within the second distance window, the processor 14 may determine that the peak is a weak peak (step S406), and evaluate a next candidate peak accordingly (step S407). Namely, the weak peak is the highest within a distance defined by the second distance window that is smaller than the first distance window. In response to the peak not being the highest within the second distance window, the processor 14 may evaluate the next candidate peak (step S407).

Taking FIG. 3 as an example, the peak P3 is the highest within the first distance window of 0.5 meters before and after the peak P3, so that the peak P3 is a strong peak. The peaks P2 and P4 are not the highest within the first distance window of 0.5 meters before and after the peaks P2 and P4, but are the highest within the second distance window of 0.1 meters before and after the peaks P2 and P4, so that the peaks P2 and P4 are weak peaks.

Referring to FIG. 2, the processor 14 determines an inertia of one or more feature parameters at multiple time points (step S240). In particular, inertia relates to a period during which one or more objects exist at those time points, but the disclosure is not limited thereto. The determining factor of the inertia may also include a matching result, which will be described in detail in the following embodiments. The feature parameter (for example, peak) in the pre-processing sensing data is one of the targets tracked by the processor 14. If a specific target/peak may be tracked at more time points, the assigned inertia (or weight) is higher and it may indicate the existence of the object. Namely, when certain conditions (for example, related to inertia) are met, the tracked target may be regarded as existence of an object, which will be described in detail in the following embodiments.

In an embodiment, the time points include two adjacent time points. For example, a first time point and a second time point, and the second time point is later than the first time point. A time difference between the two adjacent time points is, for example, 0.1 milliseconds. 1 millisecond or 10 milliseconds. The processor 14 may change the inertia of the first feature parameter according to the relationship between the first feature parameter and the second feature parameter. The first feature parameter is a feature parameter at the first time point, and the second feature parameter is a feature parameter at the second time point. Namely, the processor 14 determines whether to change the inertia corresponding to the feature parameters by determining the relationship between the feature parameters at two adjacent time points. The relationship is related to similarity or a matching degree. For example, the processor 14 determines the matching degree between the peaks of two adjacent time points separated by 2 milliseconds.

Figure 5:
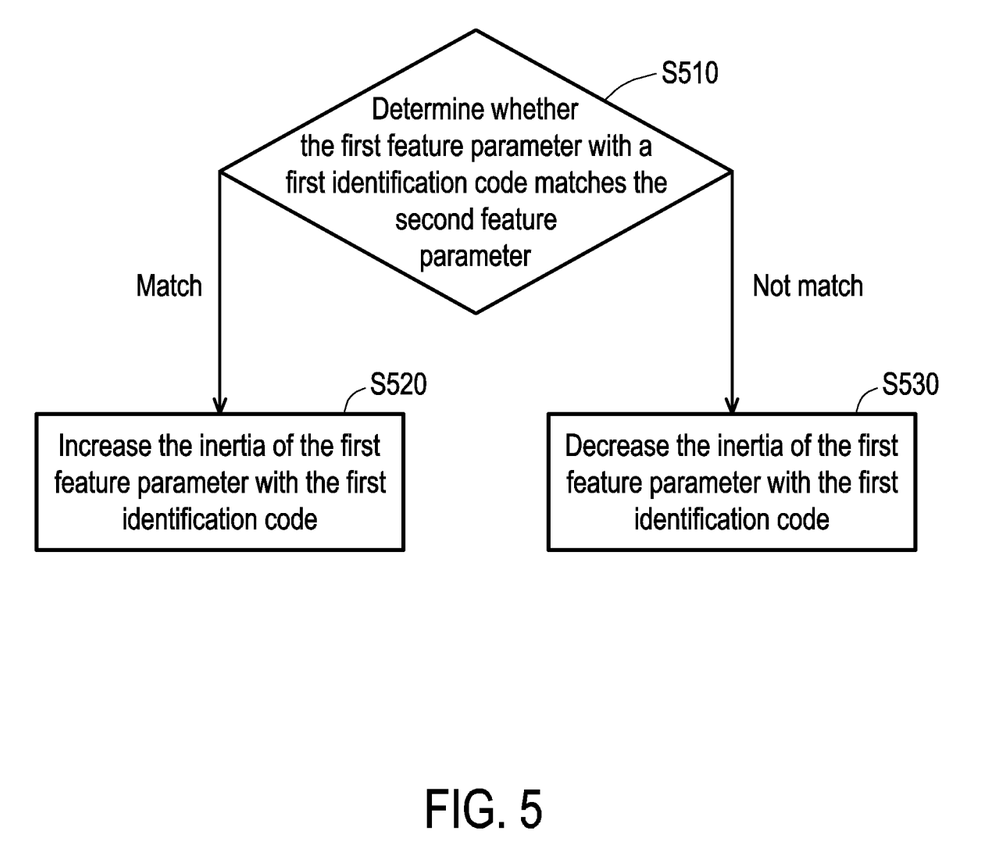
FIG. 5 is a flowchart of object matching according to an embodiment of the disclosure.

FIG. 5 is a flowchart of object matching according to an embodiment of the disclosure. Referring to FIG. 5, the first feature parameter is a feature parameter in the pre-processing sensing data, and the first feature parameter has been assigned with an identification code (for example, a first identification code). The processor 14 may determine whether the first feature parameter with the first identification code matches the second feature parameter (step S510). The first feature parameter has the first identification code in response to previous successful matching or an initial time point among those time points (i.e., a time point at which the first feature parameter is detected or identified for the first time). Namely, assignment of the identification code occurs when a feature parameter is appeared for the first time but has not been matched and/or has not been previously matched. Taking FIG. 3C as an example, the peak P3 (i.e., the first feature parameter) of a time point T0 is assigned with an identification code (for example, ID1). The second feature parameter may be the strong peak of the second time point.

In response to the fact that the first feature parameter with the first identification code matches the second feature parameter, the processor 14 may increase the inertia of the first feature parameter with the first identification code (step S520). Taking FIG. 3C as an example, if the peak P3 of the time point T0 matches a certain peak of a time point T1, the inertia is increased by one or other specific value. For another example, the inertia is multiplied by a value of two or more. In addition, if the two feature parameters match, it means that the same feature parameter (for example, peak) may be tracked continuously. In addition, the first identification code is continually provided for matching at a next time point.

In response to the fact that the first feature parameter with the first identification code does not match the second feature parameter, the processor 14 may reduce the inertia of the first feature parameter with the first identification code (step S530). Taking FIG. 3C as an example, if the peak P3 at the time point T0 does not match a certain peak at the time point T1, the inertia is reduced by one or other specific values. For another example, the inertia is divided by a value of two or more. In addition, in an embodiment, as long as the inertia corresponding to the first identification code is not lower than zero or other inertial lower limit, the first identification code is continually provided for matching at a next time point.

In an embodiment, in response to the feature parameter with the first identification code not matching the second feature parameter at the second time point, the processor 14 may assign another identification code (for example, a second identification code) to the second feature parameter. Taking FIG. 3 as an example, if a strong peak at a time point T2 does not match the strong peak with the identification code ID1 at the time point T1, the processor 14 may assign another identification code (for example, ID2) to the strong peak at the time point T2, and provide for matching of the next time point.

It should be noted that there may be more than one second feature parameter for the second time point. Therefore, in response to the unsuccessful matching, the processor 14 may continue to compare the remaining second feature parameters, and then decide whether to reduce the inertia. For example, the processor 14 compares all the strong peaks at the time point T1 until all the strong peaks are not successfully matched, which means that the strong peak/peak of the time point T0 cannot be tracked at the time point T1.

Figure 6:
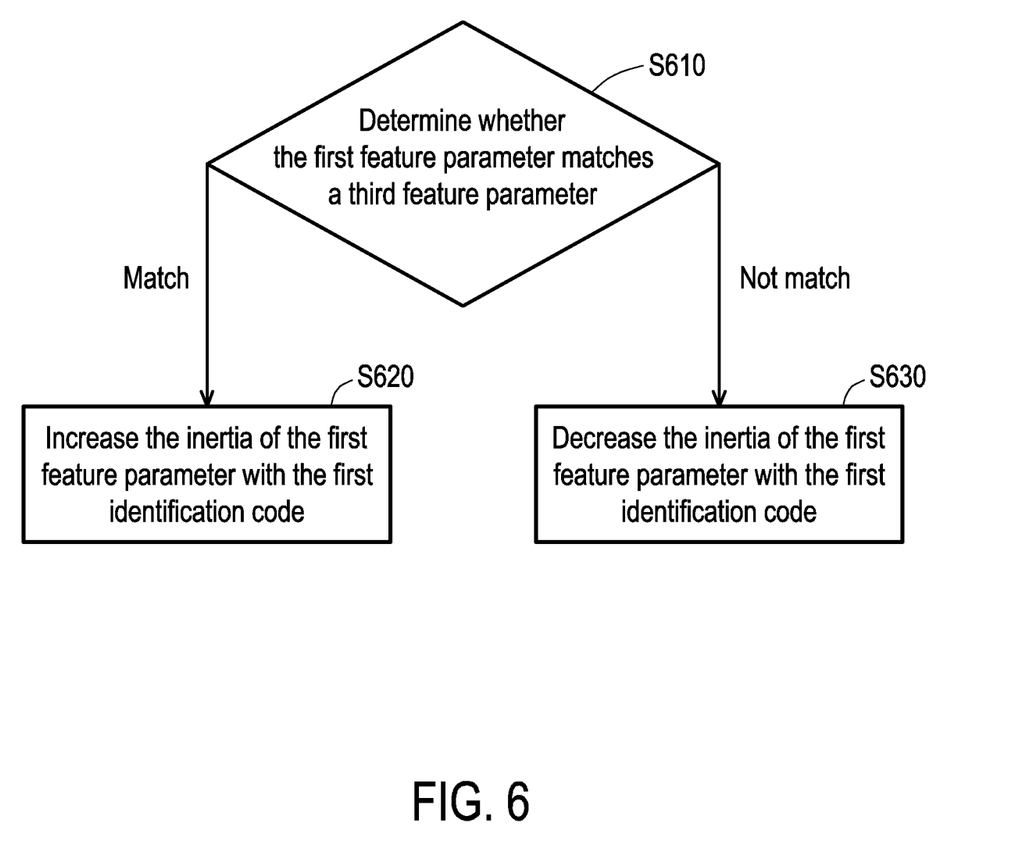
FIG. 6 is a flowchart of inertia adjustment according to an embodiment of the disclosure.

In addition, the second time point may have other feature parameters different from the first feature parameter. Therefore, in response to failure to match the first feature parameter, the processor 14 may continue to compare other remaining feature parameters before deciding whether to reduce the inertia. FIG. 6 is a flowchart of inertia adjustment according to an embodiment of the disclosure. Referring to FIG. 6, in response to the fact that the first feature parameter with the first identification code does not match the second feature parameter, the processor 14 may further determine whether the first feature parameter matches a third feature parameter (step S610). The third feature parameter is another feature parameter at the second time point. The third feature parameter may be a weak peak. Taking FIG. 3C as an example, if the peak P3 of the time point T0 does not match the strong peak of the time point T1, it is continued to determine whether the peak P3 of the time point T0 matches the weak peak of the time point T1.

In response to the fact that the first feature parameter with the first identification code matches the third feature parameter, the processor 14 may increase the inertia of the first feature parameter with the first identification code (step S620). Taking FIG. 3C as an example, if the peak P3 at the time point T0 matches a certain weak peak at the time point T1, the inertia is increased by one or other specific values. For another example, the inertia is multiplied by a value of two or more.

In response to the fact that the first feature parameter with the first identification code does not match the third feature parameter, the processor 14 may reduce the inertia of the first feature parameter with the first identification code (step S630). Taking FIG. 3C as an example, if the peak P3 at the time point T0 does not match a certain weak peak at the time point T1, the inertia is reduced by one or other specific values. For another example, the inertia is divided by a value of two or more.

It should be noted that there may be more than one third feature parameter for the second time point. Therefore, in response to the unsuccessful matching, the processor 14 may continue to compare the remaining third feature parameters, and then decide whether to reduce the inertia. For example, the processor 14 compares all of the weak peaks at the time point T1 until all of the weak peaks are not successfully matched, which means that the strong peak/peak of the time point T0 cannot be tracked at the time point T1.

Figure 7:
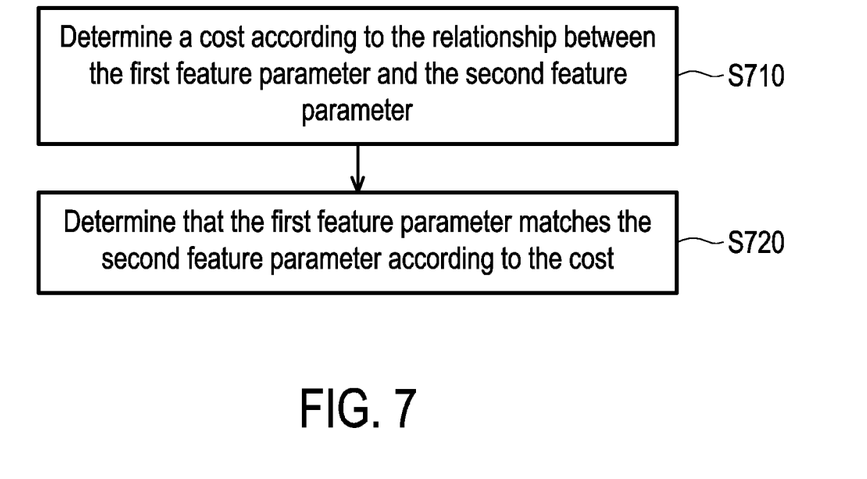
FIG. 7 is a flowchart of matching decision according to an embodiment of the disclosure.

FIG. 7 is a flowchart of matching decision according to an embodiment of the disclosure. Referring to FIG. 7, the processor 14 may determine a cost according to the relationship between the first feature parameter and the second feature parameter (step S710). For example, the processor 14 may determine the cost according to the relationship between two peaks at two adjacent time points. The relationship between the two feature parameters includes a distance between the two feature parameters, the inertia of the first feature parameter with the first identification code, and/or a moving direction change of the object corresponding to the first feature parameter with the first identification code. Generally, two feature parameters with similar or identical positions at different time points may be a same feature parameter. A feature parameter with a higher inertia corresponds to a higher probability of existence of the object. In addition, objects are usually gradually moving away or gradually approaching, and the possibility of changing from approaching to moving away or changing from moving away to approaching at the next time point is low. In some embodiments, the cost may also be related to a moving speed (for example, an approaching speed or a moving away speed), duration of the feature parameters, or other factors.

The processor 14 may determine that the first feature parameter matches the second feature parameter according to the cost (step S720). The relationship between one or more two feature parameters may be quantified into a value. The values corresponding to multiple feature parameters may also be subjected to weighting operations or other mathematical operations to obtain the cost. For example, the distance between the peaks of two adjacent time points being less than 10 cm has a lower cost; the peaks with an inertia of more than 50 have a lower cost; the peaks with similar moving away/approaching speeds have a lower cost; and the peaks with unchanged positions and changed from approaching to moving away or from moving away to approaching have a higher cost. The processor 14 may compare the cost with a corresponding threshold; if the cost is higher than the corresponding threshold, the two peaks are not matched; if the cost is lower than the corresponding threshold, the two peaks are matched. However, there may be other variations in the calculation mechanism between relationships, costs, and matching results.

It should be noted that if the costs corresponding to one second feature parameter at the second time point and multiple first feature parameters at the first time point are all higher than the corresponding threshold (or meet other matching conditions), the processor 14 may select one of the first feature parameters to match the second feature parameter according to the costs. For example, the first feature parameter with the lowest matching cost is matched with the second feature parameter.

Referring to FIG. 2, the processor 14 determines a number of one or more objects according to the inertia (step S250). Specifically, according to the aforementioned embodiment of changing the inertia, if the inertia is increased, it means that the same feature parameter (for example, peak) is tracked; if the inertia is decreased, it means that the same feature parameter (or example, peak) cannot be tracked. The greater the inertia is, the higher probability the object exists. The smaller the inertia is, the higher probability the object does not exist.

Figure 8:
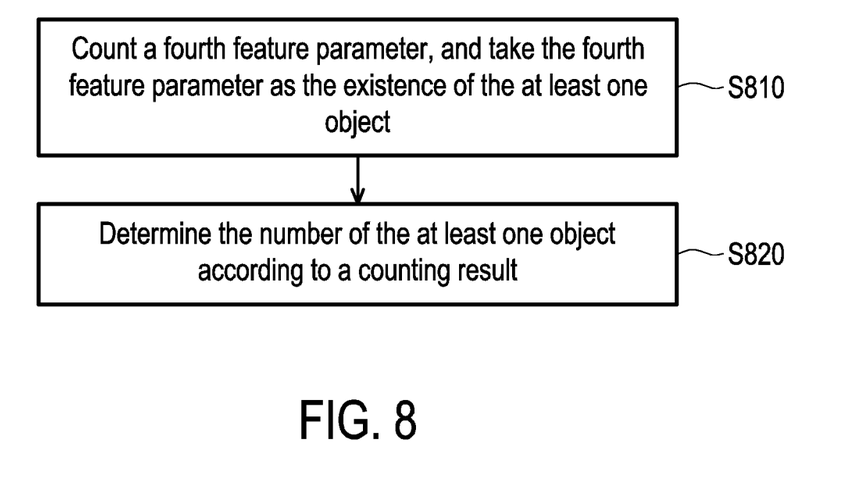
FIG. 8 is a flowchart of number counting according to an embodiment of the disclosure.

FIG. 8 is a flowchart of number counting according to an embodiment of the disclosure. Referring to FIG. 8, the time points include another time point (for example, a third time point, which may be the same as or different from the aforementioned first and second time points). For example, a time point T5 in FIG. 3. The processor 14 may count one or more fourth feature parameters with an inertia greater than an inertia threshold at the third time point, and take the one or more fourth feature parameters as existence of one or more objects (step S810). These fourth feature parameters are feature parameters of the third time point. According to a difference in an inertia adjustment range and a time difference between the adjacent time points, the inertia threshold is, for example, 50, 100 or 200, and an upper limit and/or a lower limit may be set. The processor 14 may calculate the number of all feature parameters greater than the inertia threshold at the same time point.

The processor 14 may determine a number of one or more objects at the third time point according to a counting result of the one or more feature parameters (step S820). Namely, the number of all feature parameters greater than the inertia threshold is the number of the objects at the third time point.

As for the feature parameters with an inertia not greater than the inertia threshold, the processor 14 disables/prohibits/does not consider the existence of object, so that it is not included in the aforementioned counting result.

In an embodiment, the time points include another time point (for example, a fourth time point). The fourth time point is adjacent to the third time point but later than the third time point. For example, the third time point is a time point T4 in FIG. 3, and the fourth time point is a time point T5 in FIG. 3. The processor 14 may retain the identification code of the fourth feature parameter at the fourth time point. As long as the inertia is high enough (for example, exceeds the inertia threshold), the same identification code may be continually retained.

Figure 9:
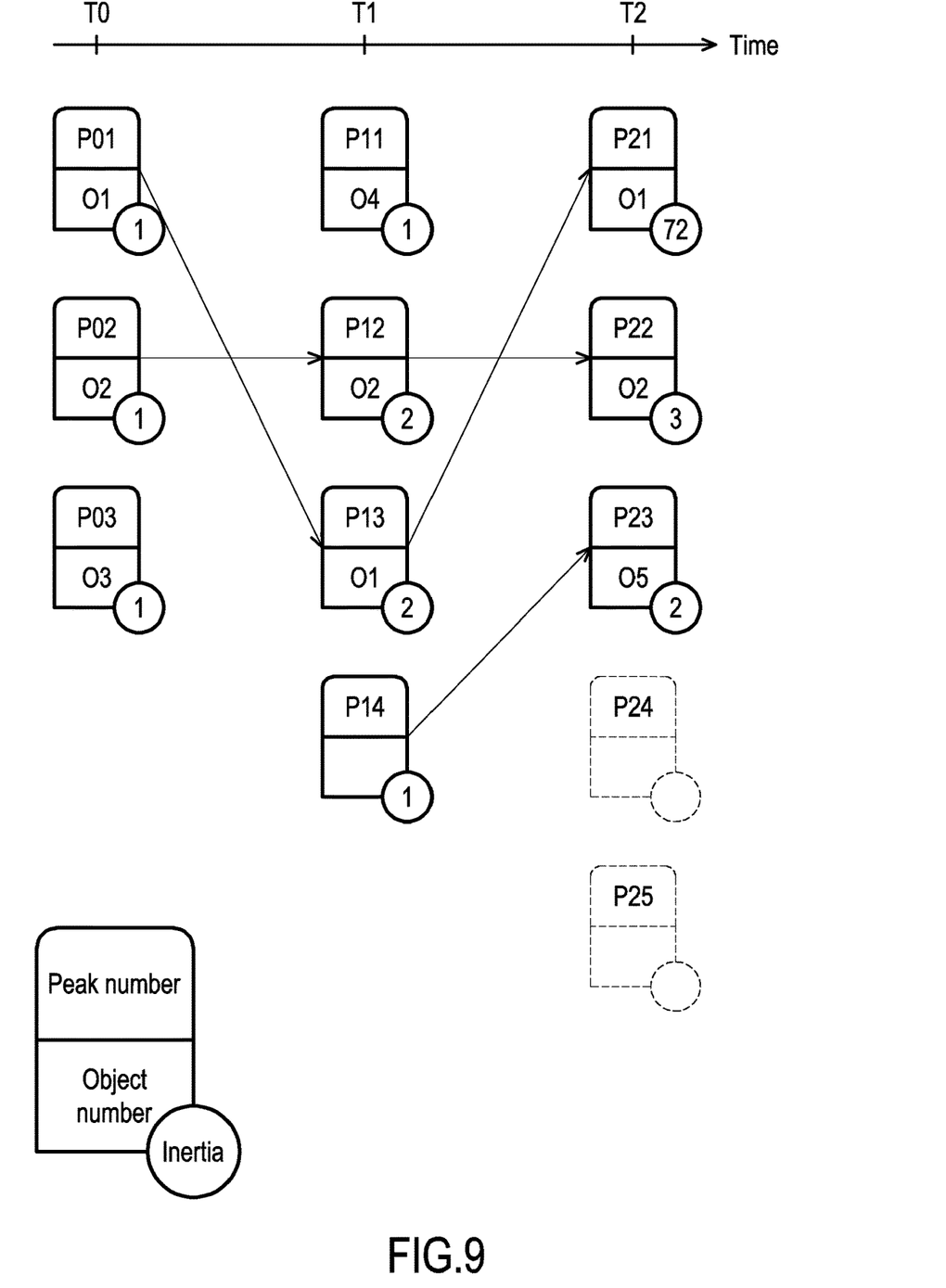
FIG. 9 is a schematic diagram of object matching according to an embodiment of the disclosure.

In order to help readers understanding the spirit of the disclosure, application situations are provided below. FIG. 9 is a schematic diagram of object matching according to an embodiment of the disclosure. Referring to FIG. 9, at the time point T0, peaks P01, P02, and P03 are strong peaks, and are respectively assigned with identification codes O1, O2, and O3 and have an initial inertia (for example, 1). At the time point T1, the peak P01 of the time point T0 matches a peak P13 at the time point T1, so that the identification code O1 is continually used, and the inertia is increased by one (for example, 2 is obtained). The peak P02 of the time point T0 matches a peak P12 at the time point T1, so that the identification code O2 is continually used, and the inertia is increased by one (for example, 2 is obtained). The peaks P11 and P14 at the time point T1 are strong peaks, but do not match any of the peaks at the time point, so that they are assigned with identification codes O4 and O5 respectively. At the time point T2, the peak P13 of the time point T1 matches a peak P21 at the time point T2, so that the identification code O1 is continually used, and the inertia is increased by one (for example, 3 is obtained). The peak P12 of the time point T1 matches a peak P22 at the time point T2, so that the identification code O2 is continually used, and the inertia is increased by one (for example, 3 is obtained). The peak P14 of the time point T1 matches a peak P23 at the time point T2, so that the identification code O5 is continually used, and the inertia is increased by one (for example, 2 is obtained). The peaks P24 and P25 at the time point T2 are weak peaks and do not match any of the peaks at the time point T1, so that none of the peaks P24 and P25 is assigned with the identification code.

Figure 10:
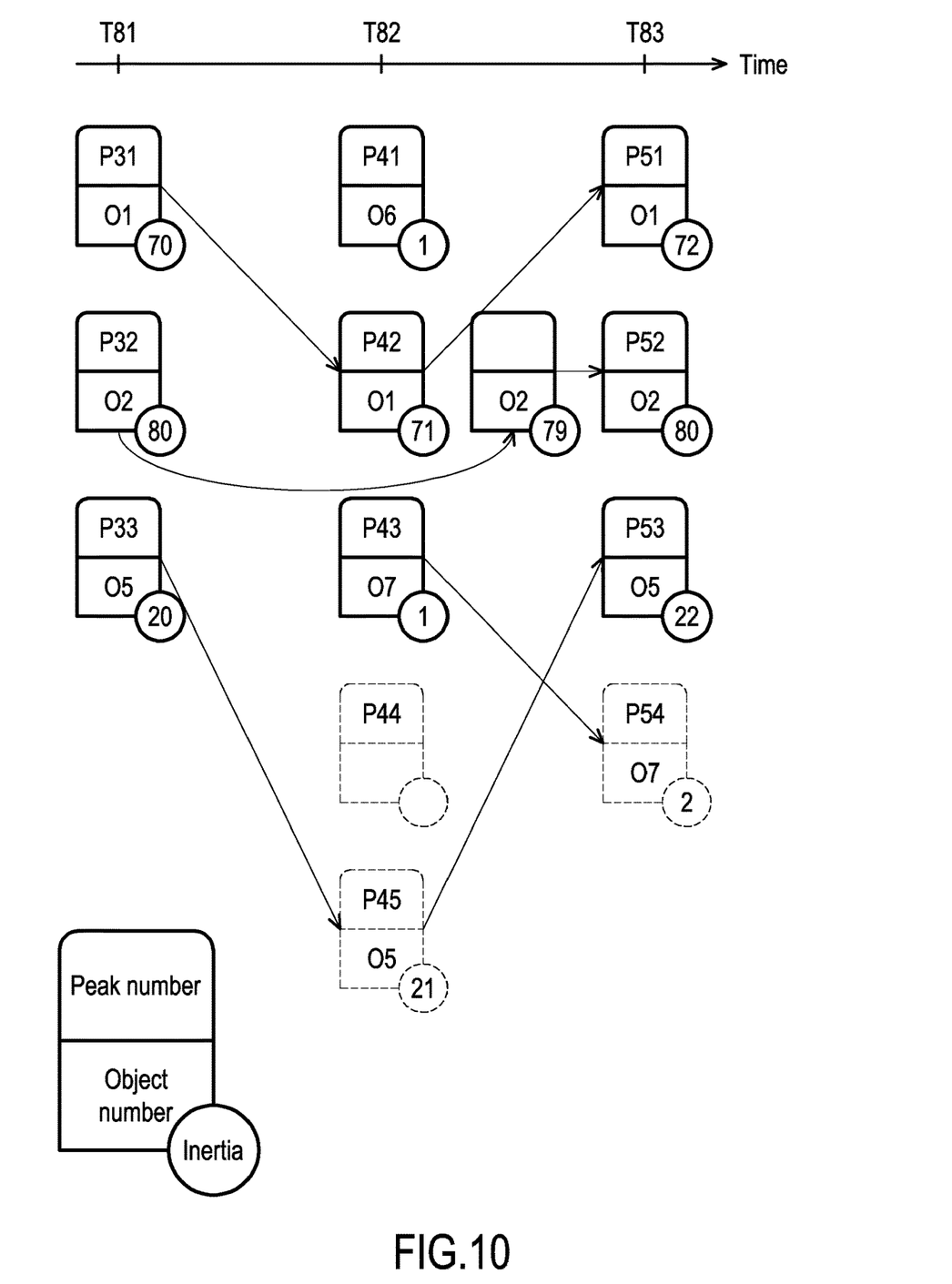
FIG. 10 is a schematic diagram of object matching according to an embodiment of the disclosure.

FIG. 10 is a schematic diagram of object matching according to an embodiment of the disclosure. Referring to FIG. 10, after a period of time, at a time point T81, peaks P31, P32, and P33 respectively have identification codes O1, O2, and O5 and inertias thereof are 70, 80, and 20 respectively. If the inertial threshold value is 65, the existence of two objects may be obtained at the time point T81. At a time point T82, the peak P31 of the time point T81 matches a peak P42 at the time point T82, so that the identification code O1 is continually used, and the inertia is increased by one (for example, 71 is obtained). The peak P3 of the time point T81 does not match any peak at the time point T82, so that the inertia is reduced by one (for example, 79 is obtained). The peak P33 of the time point T81 matches a peak P45 (which is a weak peak) at the time point T82, so that the identification code O5 is continually used, and the inertia is increased by one (for example, 21 is obtained). A peak P41 (a strong peak) at the time point T82 is not successfully matched with any peak of the time point T81, so that the peak P41 is assigned with an identification code O6 and an initial inertia (for example, 1). A peak P44 at the time point T82 is a weak peak and does not match any peak of the time point T81, so that no identification code is assigned for the peak P44.

At a time point T83, the peak P42 of the time point T82 matches a peak P51 at the time point T83, so that the identification code O1 is continually used, and the inertia is increased by one (for example, 72 is obtained). The peak P32 of the time point T81 matches a peak P52 at the time point T83, so that the identification code O2 is continually used, and the inertia is increased by one (for example, 80 is obtained). The peak P43 of the time point T82 matches a peak P54 (which is a weak peak) at the time point T83, so that the identification code O7 is continually used, and the inertia is increased by one (for example, 2 is obtained). The peak P45 of the time point T82 matches a peak P53 at the time point T83, so that the identification code O7 is continually used, and the inertia is increased by one (for example, 2 is obtained).

Figure 11:
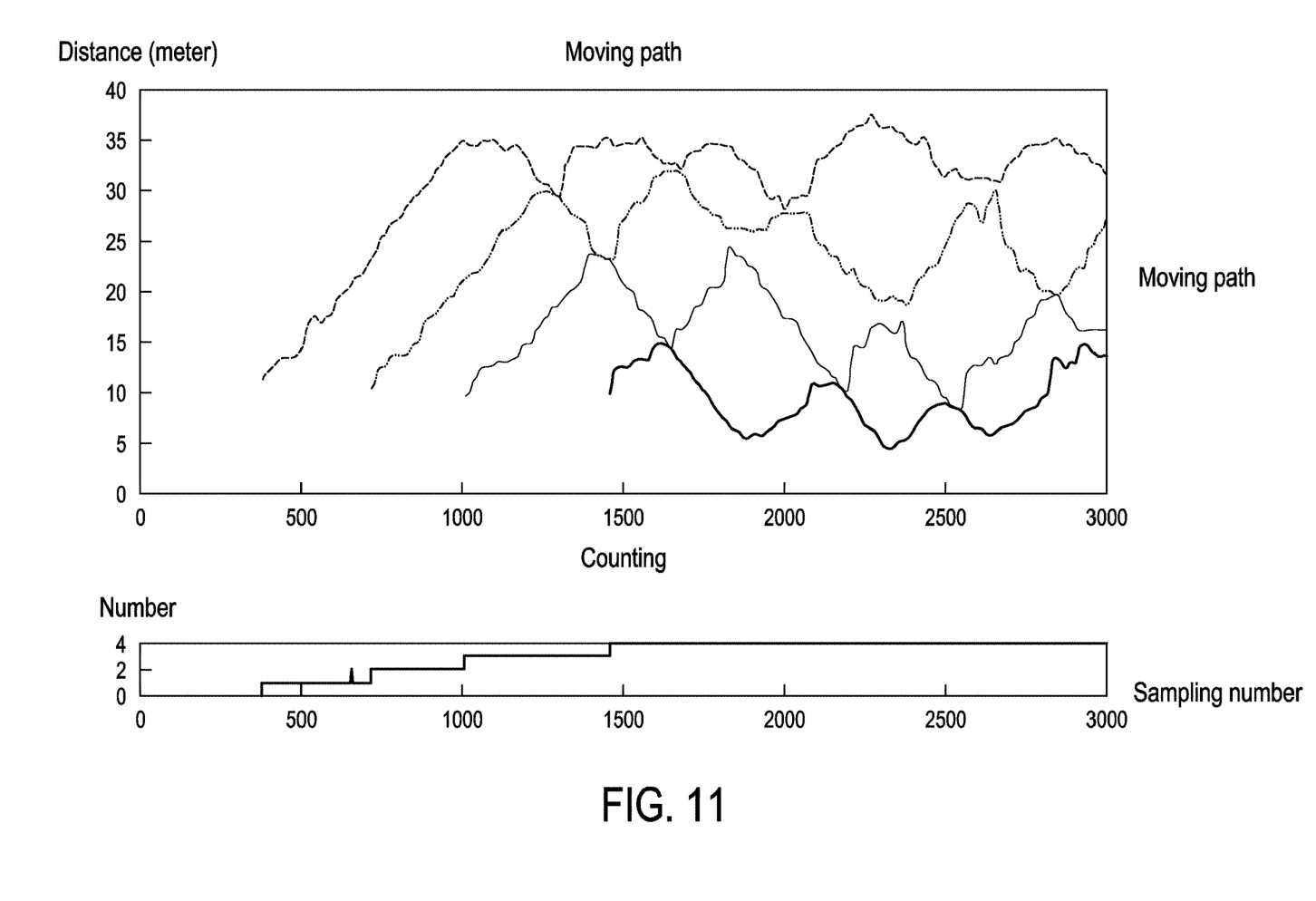
FIG. 11 is a schematic diagram of multi-object tracking according to an embodiment of the disclosure.

FIG. 11 is a schematic diagram of multi-object tracking according to an embodiment of the disclosure. Referring to FIG. 11, dotted lines represent moving paths of different objects at different time points. It should be noted that the single antenna limitation may lead to tracking errors. For example, it misjudged that the object moves from a distance of 10 meters to a distance of 35 meters and then moves to a distance of 5 meters. However, the object detection method of the embodiment of the disclosure may still correctly determine four objects. For example, processor 14 initially takes the first peak as the existence of an object. Then, the processor 14 detects a second peak, but this peak does not match the first peak. Therefore, the processor 14 takes the second peak as the existence of another object. The others may be deduced by analogy, and details thereof are not repeated here. Namely, the embodiment of the disclosure may determine the number of the objects as long as matching of the peaks continues.

In summary, in the object sensing method and the radar apparatus according to the embodiments of the disclosure, the feature parameters of different time points are tracked, the inertia is adjusted according to the tracking result/matching result, and whether the object exists is determined according to the inertia. In addition, the feature parameter may be obtained from the peak in the corresponding relationship between the distance and the sensing intensity. In this way, the accuracy of number estimation of the single antenna radar may be improved, and there is no doubt in privacy violation.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An object sensing method, adapted to a single antenna radar, comprising:

obtaining initial sensing data through a single antenna, wherein the initial sensing data is generated according to an echo received by the single antenna, and the initial sensing data comprises sensing intensities of a plurality of time points;

converting the initial sensing data into pre-processing sensing data, wherein the pre-processing sensing data comprises a corresponding relationship between a plurality of distances and the sensing intensities at the time points;

obtaining at least one feature parameter in the pre-processing sensing data, wherein the at least one feature parameter responds to existence of at least one object;

determining an inertia of the at least one feature parameter between the time points, wherein the inertia is a period during which the at least one object exists at the time points, the time points comprise a first time point and a second time point, the second time point is later than the first time point, and determining the inertia of the at least one feature parameter between the time points comprises:

changing an inertia of a first feature parameter according to a relationship between the first feature parameter and a second feature parameter, wherein the first feature parameter is a feature parameter at the first time point, and the second feature parameter is a feature parameter at the second time point; and determining a number of the at least one object according to the inertia.

2. The object sensing method according to claim 1, wherein changing the inertia of the first feature parameter comprises:

determining whether the first feature parameter with a first identification code matches the second feature parameter, wherein the first identification code is obtained in response to matching success or an initial time point among the time points;

increasing the inertia of the first feature parameter with the first identification code in response to the first feature parameter with the first identification code matching the second feature parameter; and decreasing the inertia of the first feature parameter with the first identification code in response to the first feature parameter with the first identification code not matching the second feature parameter.

3. The object sensing method according to claim 2, wherein decreasing the inertia of the first feature parameter with the first identification code in response to the first feature parameter with the first identification code not matching the second feature parameter comprises:

determining whether the first feature parameter matches a third feature parameter, wherein the third feature parameter is another feature parameter at the second time point;

increasing the inertia of the first feature parameter with the first identification code in response to the first feature parameter with the first identification code matching the third feature parameter; and decreasing the inertia of the first feature parameter with the first identification code in response to the feature parameter with the first identification code not matching the third feature parameter.

4. The object sensing method according to claim 2, further comprising:

assigning a second identification code to the second feature parameter in response to the feature parameter with the first identification code not matching the second feature parameter at the second time point.

5. The object sensing method according to claim 2, wherein determining whether the first feature parameter with the first identification code matches the second feature parameter comprises:

determining a cost according to the relationship between the first feature parameter and the second feature parameter; and determining that the first feature parameter matches the second feature parameter according to the cost.

6. The object sensing method according to claim 5, wherein the relationship between the first feature parameter and the second feature parameter comprises at least one of a distance between the first feature parameter and the second feature parameter, the inertia of the first feature parameter, and a moving direction change of an object corresponding to the first feature parameter.

7. An object sensing method, adapted to a single antenna radar, comprising:

obtaining initial sensing data through a single antenna, wherein the initial sensing data is generated according to an echo received by the single antenna, and the initial sensing data comprises sensing intensities of a plurality of time points;

converting the initial sensing data into pre-processing sensing data, wherein the pre-processing sensing data comprises a corresponding relationship between a plurality of distances and the sensing intensities at the time points;

obtaining at least one feature parameter in the pre-processing sensing data, wherein the at least one feature parameter responds to existence of at least one object;

determining an inertia of the at least one feature parameter between the time points, wherein the inertia is a period during which the at least one object exists at the time points; and determining a number of the at least one object according to the inertia, wherein the time points further comprise a third time point, and determining the number of the at least one object according to the inertia comprises:

counting at least one fourth feature parameter with an inertia greater than an inertia threshold at the third time point, and taking the at least one fourth feature parameter as the existence of the at least one object, wherein the at least one fourth feature parameter is a feature parameter of the third time point; and determining the number of the at least one object at the third time point according to a counting result of the at least one fourth feature parameter.

8. The object sensing method according to claim 7, wherein the time points further comprise a fourth time point, the fourth time point is later than the third time point, and the object sensing method further comprises:

retaining an identification code of the at least one fourth feature parameter at the fourth time point.

9. The object sensing method according to claim 3, wherein the first feature parameter, the second feature parameter, and the third feature parameter are all a peak, and conditions of the peak comprise at least one of the followings:

higher than two neighboring values;

higher than a peak threshold; and not noise determined by a constant false alarm rate (CFAR).

10. The object sensing method according to claim 9, wherein the peak comprises a strong peak and a weak peak, the first feature parameter and the second feature parameter are both the strong peak, the third feature parameter is the weak peak, and the object sensing method further comprises:

determining the peak as the strong peak in response to the peak being the highest within a first distance window; and determining the peak as the weak peak in response to the peak being the highest within a second distance window, wherein the second distance window is smaller than the first distance window.

11. The object sensing method according to claim 1, wherein converting the initial sensing data into the pre-processing sensing data comprises:
 performing fast Fourier transform (FFT), denoising, and normalization on the initial sensing data to generate the pre-processing sensing data.

12. A radar apparatus, comprising:
 a single antenna;
 a transmitting circuit, coupled to the single antenna, and configured to transmit a sensing signal;
 a receiving circuit, coupled to the single antenna, and configured to receive an echo of the sensing signal; and
 a processor, coupled to the receiving circuit, configured to:
  convert initial sensing data corresponding to the echo into pre-processing sensing data, and
  calculate a number of at least one object corresponding to the pre-processing sensing data, wherein the initial sensing data comprises sensing intensities of a plurality of time points, the pre-processing sensing data comprises a corresponding relationship between a plurality of distances and the sensing intensities at the time points, and the processor is further configured to:
   obtain at least one feature parameter in the pre-processing sensing data, wherein the at least one feature parameter responds to existence of the at least one object;
   determine an inertia of the at least one feature parameter between the time points, wherein the inertia is a period during which the at least one object exists at the time points, the time points comprise a first time point and a second time point, and the second time point is later than the first time point;
   change an inertia of a first feature parameter according to a relationship between the first feature parameter and a second feature parameter, wherein the first feature parameter is a feature parameter at the first time point, and the second feature parameter is a feature parameter at the second time point; and
   determine the number of the at least one object according to the inertia.

13. The radar apparatus according to claim 12, wherein the processor is further configured to:
 determine whether the first feature parameter with a first identification code matches the second feature parameter, wherein the first identification code is obtained in response to matching success or an initial time point among the time points;
 increase the inertia of the first feature parameter with the first identification code in response to the first feature parameter with the first identification code matching the second feature parameter; and
 decrease the inertia of the first feature parameter with the first identification code in response to the first feature parameter with the first identification code not matching the second feature parameter.

14. The radar apparatus according to claim 13, wherein the processor is further configured to:
 determine whether the first feature parameter matches a third feature parameter in response to the first feature parameter with the first identification code not matching the second feature parameter, wherein the third feature parameter is another feature parameter at the second time point;
 increase the inertia of the first feature parameter with the first identification code in response to the first feature parameter with the first identification code matching the third feature parameter; and
 decrease the inertia of the first feature parameter with the first identification code in response to the feature parameter with the first identification code not matching the third feature parameter.

15. The radar apparatus according to claim 13, wherein the processor is further configured to assign a second identification code to the second feature parameter in response to the feature parameter with the first identification code not matching the second feature parameter at the second time point.

16. The radar apparatus according to claim 13, wherein the processor is further configured to determine a cost according to the relationship between the first feature parameter and the second feature parameter, and determine that the first feature parameter matches the second feature parameter according to the cost.

17. The radar apparatus according to claim 12, wherein the processor is further configured to:
 count at least one fourth feature parameter with an inertia greater than an inertia threshold at a third time point, and taking the at least one fourth feature parameter as an existence of the at least one object, wherein the at least one fourth feature parameter is a feature parameter of the third time point; and
 determine the number of the at least one object at the third time point according to a counting result of the at least one fourth feature parameter.

* * * * *